United States Patent
Fujita

(10) Patent No.: US 10,218,796 B2
(45) Date of Patent: Feb. 26, 2019

(54) COMMUNICATION APPARATUS AND CONTROL METHOD FOR SERVICE DISCOVERY PROCESSING

(71) Applicant: CANON KABUSHIKI KAISHA, Tokyo (JP)

(72) Inventor: Shunji Fujita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 335 days.

(21) Appl. No.: 14/723,109

(22) Filed: May 27, 2015

(65) Prior Publication Data

US 2015/0350346 A1    Dec. 3, 2015

(30) Foreign Application Priority Data

May 30, 2014    (JP) ................. 2014-113128

(51) Int. Cl.
| | |
|---|---|
| *H04L 29/08* | (2006.01) |
| *H04L 12/26* | (2006.01) |
| *H04W 4/80* | (2018.01) |
| *H04W 4/00* | (2018.01) |
| *H04W 4/06* | (2009.01) |

(52) U.S. Cl.
CPC .............. *H04L 67/16* (2013.01); *H04L 43/10* (2013.01); *H04W 4/008* (2013.01); *H04W 4/80* (2018.02); *H04W 4/06* (2013.01)

(58) Field of Classification Search
CPC ........ H04L 43/10; H04L 67/16; H04W 4/008; H04W 4/06
USPC ......................................................... 709/224
See application file for complete search history.

(56) References Cited

U.S. PATENT DOCUMENTS

| | | | | |
|---|---|---|---|---|
| 6,085,186 | A | * | 7/2000 | Christianson ..... G06F 17/30864 |
| 2002/0120932 | A1 | * | 8/2002 | Schwalb ............. H04L 12/2805 |
| | | | | 725/37 |

(Continued)

FOREIGN PATENT DOCUMENTS

| | | |
|---|---|---|
| EP | 0821522 A2 | 1/1998 |
| JP | 2008-205960 A | 9/2008 |
| JP | 2014-081937 A | 5/2014 |

*Primary Examiner* — Michael C Lai
(74) *Attorney, Agent, or Firm* — Canon USA Inc., IP Division

(57) ABSTRACT

A method of controlling a communication apparatus includes searching for external apparatus information about an external apparatus sent from the external apparatus, displaying identification information for identifying the external apparatus by using a web browser, based on the searched external apparatus information, and receiving, based on the identification information displayed by using the web browser, designation of any piece of identification information, wherein the searching searches for external apparatus information sent from an external apparatus that does not belong to a same network as the communication apparatus, and wherein in a case where designation of identification information about the external apparatus that does not belong to the same network as the communication apparatus is received, the communication apparatus is caused to belong to the same network as an external apparatus corresponding to the designated identification information and a communication is established between the communication apparatus and the external apparatus.

17 Claims, 14 Drawing Sheets

(56) References Cited

U.S. PATENT DOCUMENTS

| | | | |
|---|---|---|---|
| 2003/0030664 A1* | 2/2003 | Parry | G06F 9/4411 |
| | | | 715/744 |
| 2006/0044599 A1* | 3/2006 | Lipowitz | G06Q 30/0641 |
| | | | 358/1.15 |
| 2007/0177822 A1* | 8/2007 | Uno | H04N 1/00204 |
| | | | 382/305 |
| 2011/0117842 A1* | 5/2011 | Hong | H04M 1/7253 |
| | | | 455/41.2 |
| 2012/0207440 A1* | 8/2012 | Hinkel | G08B 13/19676 |
| | | | 386/224 |
| 2013/0094047 A1* | 4/2013 | Bailey | H04L 63/18 |
| | | | 358/1.14 |
| 2013/0201351 A1* | 8/2013 | Matsuda | H04N 1/00307 |
| | | | 348/207.1 |

* cited by examiner

| ID | WEB SERVICE INFORMATION | | WIRELESS NETWORK INFORMATION | | |
|---|---|---|---|---|---|
| | TITLE | URL | MAC ADDRESS | SSID | ENCRYPTION KEY |
| 1 | Print | http://printer/print/ | XX:XX:XX:XX:XX:XX | PRINTER | - |
| 2 | Remote Capture | http://camera/capture/ | YY:YY:YY:YY:YY:YY | CAMERA | - |

| ID | WEB SERVICE INFORMATION | | WIRELESS NETWORK INFORMATION | | |
|---|---|---|---|---|---|
| | TITLE | URL | MAC ADDRESS | SSID | ENCRYPTION KEY |
| 1 | Print | http://printer/print/ | XX:XX:XX:XX:XX:XX | PRINTER | - |
| 2 | Remote Capture | http://camera/capture/ | YY:YY:YY:YY:YY:YY | CAMERA | - |
| 3 | Image Browser | http://videocamera/browse/ | ZZ:ZZ:ZZ:ZZ:ZZ:ZZ | VIDEOCAMERA | - |

FIG. 4

| ID | MAC ADDRESS | SSID | ENCRYPTION KEY | CONNECTION STATUS |
|---|---|---|---|---|
| 1 | WW:WW:WW:WW:WW:WW | AP_X | 12345678 | CONNECTED |
| 2 | XX:XX:XX:XX:XX:XX | PRINTER | - | DISCONNECTED |
| 3 | YY:YY:YY:YY:YY:YY | CAMERA | - | DISCONNECTED |
| 4 | ZZ:ZZ:ZZ:ZZ:ZZ:ZZ | VIDEOCAMERA | - | DISCONNECTED |

FIG. 5A

| ID | WEB SERVICE INFORMATION | | WIRELESS NETWORK INFORMATION | | |
|---|---|---|---|---|---|
| | TITLE | URL | MAC ADDRESS | SSID | ENCRYPTION KEY |
| 1 | Weather | http://www.weather.com/ | | | |
| 2 | News | http://www.news.com/ | | | |
| 3 | Dictionary | http://www.dictionary.com/ | | | |

| ID | WEB SERVICE INFORMATION | | WIRELESS NETWORK INFORMATION | | |
|---|---|---|---|---|---|
| | TITLE | URL | MAC ADDRESS | SSID | ENCRYPTION KEY |
| 1 | Weather | http://www.weather.com/ | ZZ:ZZ:ZZ:ZZ:ZZ:ZZ | AP_X | 12345678 |
| 2 | News | http://www.news.com/ | | | |
| 3 | Dictionary | http://www.dictionary.com/ | | | |

| ID | WEB SERVICE INFORMATION | | WIRELESS NETWORK INFORMATION | | |
|---|---|---|---|---|---|
| | TITLE | URL | MAC ADDRESS | SSID | ENCRYPTION KEY |
| 1 | Weather | http://www.weather.com/ | ZZ:ZZ:ZZ:ZZ:ZZ:ZZ | AP_X | 12345678 |
| 2 | News | http://www.news.com/ | | | |
| 3 | Dictionary | http://www.dictionary.com/ | | | |
| 4 | Print | http://printer/print/ | XX:XX:XX:XX:XX:XX | PRINTER | - |
| 5 | Remote Capture | http://camera/capture/ | YY:YY:YY:YY:YY:YY | CAMERA | - |

FIG. 5D

| ID | WEB SERVICE INFORMATION | | WIRELESS NETWORK INFORMATION | | |
|---|---|---|---|---|---|
| | TITLE | URL | MAC ADDRESS | SSID | ENCRYPTION KEY |
| 1 | Weather | http://www.weather.com/ | ZZ:ZZ:ZZ:ZZ:ZZ:ZZ | AP_X | 12345678 |
| 2 | News | http://www.news.com/ | ZZ:ZZ:ZZ:ZZ:ZZ:ZZ | AP_X | 12345678 |
| 3 | Dictionary | http://www.dictionary.com/ | ZZ:ZZ:ZZ:ZZ:ZZ:ZZ | AP_X | 12345678 |
| 4 | Print | http://printer/print/ | XX:XX:XX:XX:XX:XX | PRINTER | - |
| 5 | Remote Capture | http://camera/capture/ | YY:YY:YY:YY:YY:YY | CAMERA | - |
| 6 | Image Browser | http://videocamera/browse/ | ZZ:ZZ:ZZ:ZZ:ZZ:ZZ | VIDEOCAMERA | - |

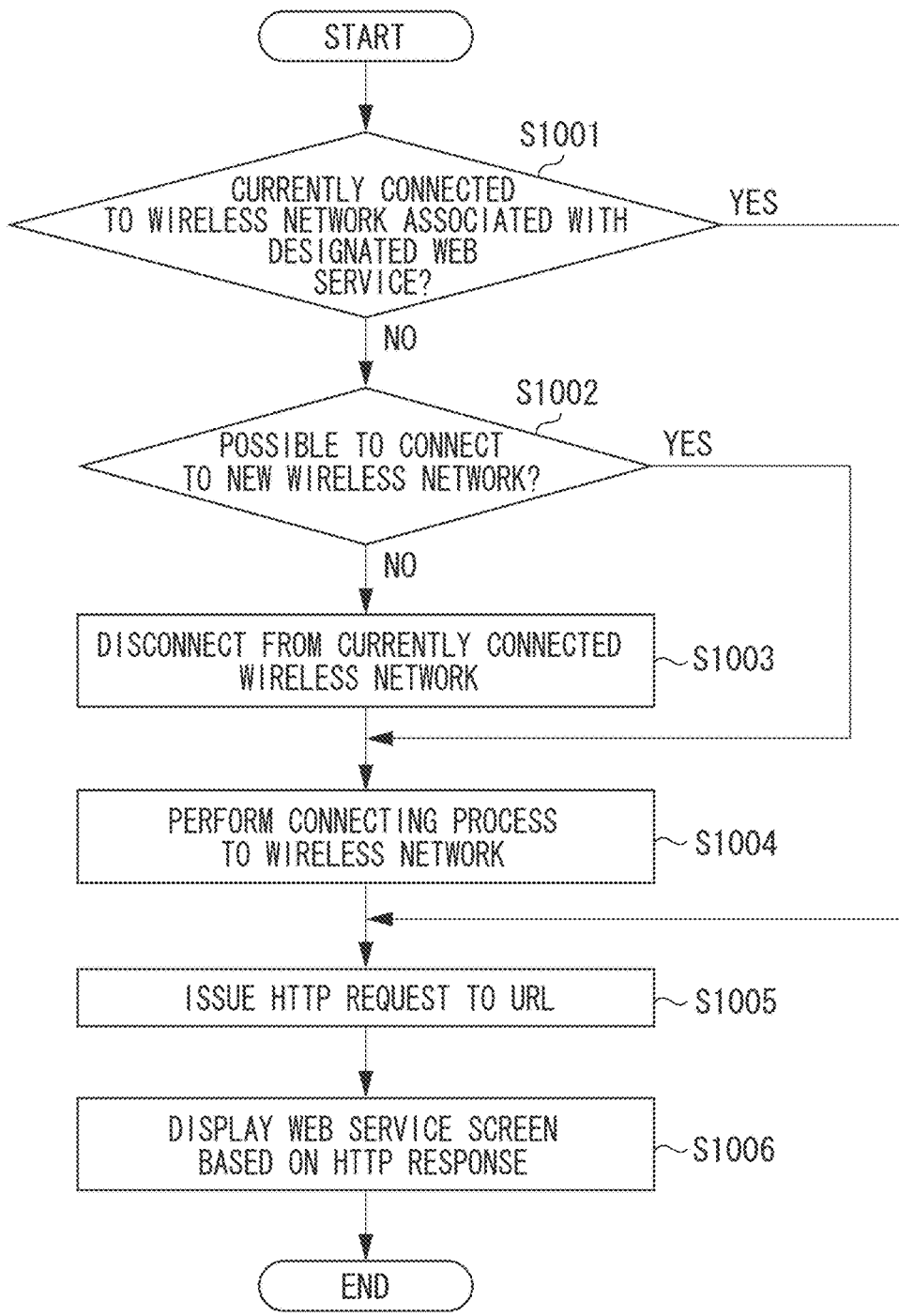

COMMUNICATION APPARATUS AND CONTROL METHOD FOR SERVICE
DISCOVERY PROCESSING

BACKGROUND OF THE INVENTION

Field of the Invention

The present invention relates to a communication apparatus having a web browser function.

Description of the Related Art

In recent years, wireless technologies have become widely used. Mobile apparatuses, such as a camera and the like, that include a wireless communication function to communicate with an external apparatus, such as a personal computer (PC), are known. Japanese Patent Application Laid-Open No. 2008-205960 discusses a technique that is an example of this type of communication. Specifically, a camera serves as a Hypertext Transfer Protocol (HTTP) server, and images stored in the camera are available to the public. Then, a PC user browses the images stored in the camera, using a browser. This technique, however, is complicated because the PC user is required to directly input a uniform resource locator (URL) of the HTTP server by using the browser.

SUMMARY OF THE INVENTION

According to an aspect of the present invention, a communication apparatus capable of communicating with an external apparatus via a network includes a search unit configured to search for external apparatus information sent from an external apparatus, the external apparatus information being about the external apparatus, a display control unit configured to perform control so as to display identification information for identifying the external apparatus by using a web browser, based on the external apparatus information searched by the search unit, a reception unit configured to, based on the identification information displayed by using the web browser, receive designation of any piece of identification information, and a communication control unit configured to establish communication with an external apparatus corresponding to the identification information for which the designation is received, wherein the search unit is capable of searching for external apparatus information sent from an external apparatus that does not belong to a same network as the communication apparatus, and wherein in a case where the reception unit receives designation for identification information about the external apparatus that does not belong to the same network as the communication apparatus, the communication control unit performs control to cause the communication apparatus to belong to the same network as an external apparatus corresponding to the designated identification information and establish a communication with the external apparatus.

Further features of the present invention will become apparent from the following description of exemplary embodiments (with reference to the attached drawings).

BRIEF DESCRIPTION OF THE DRAWINGS

FIGS. 3A and 3B are diagrams each illustrating a detected service management table.

FIG. 4 is a diagram illustrating connection statuses.

FIGS. 5A, 5B, 5C, and 5D are diagrams each illustrating a bookmark management table.

FIG. 10 is a flow chart illustrating a web server connection process of the communication apparatus.

DESCRIPTION OF THE EMBODIMENTS

<Hardware Configuration of Communication Apparatus and External Apparatus>

A hardware configuration of a communication apparatus and an external apparatus according to an exemplary embodiment will be described below with reference to FIG. 1.

Figure 1:
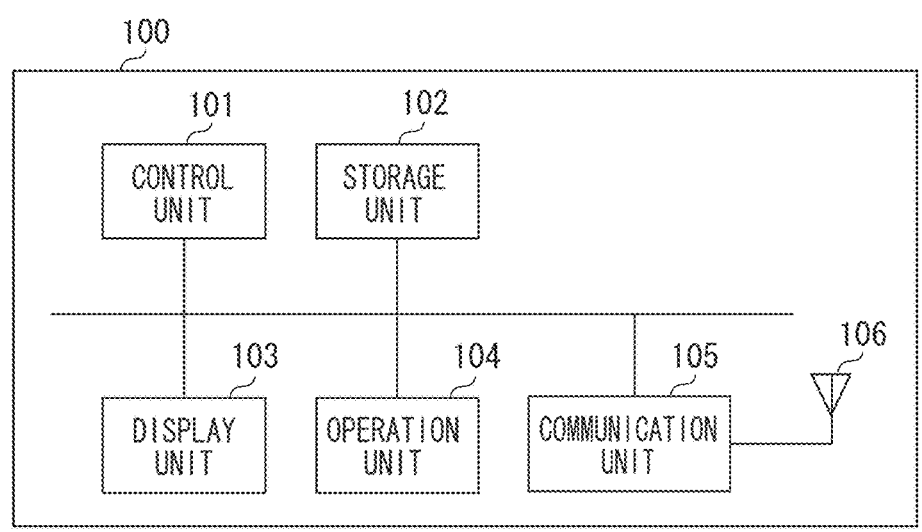
FIG. 1 is a diagram illustrating a hardware configuration of a communication apparatus and an external apparatus.

An entire apparatus 100 is illustrated in the FIG. 1.

The apparatus 100 includes a control unit 101. The control unit 101 executes a control program stored in a storage unit 102 to control hardware of the entire apparatus. The control unit 101 includes one or a plurality of processors, such as a central processing unit (CPU), a micro processing unit (MPU), and the like, and performs control, such as display control, input/output control, communication control, storage control, and the like.

The apparatus 100 includes the storage unit 102. The storage unit 102 stores the control program to be executed by the control unit 101 and various types of information. The various types of information may include various types of data relating to the control program as well as image data, files, and the like, to be sent to and received from the external apparatus via a communication unit 105. The storage unit 102 includes a read-only memory (ROM), a random access memory (RAM), a hard disk drive (HDD), a flash memory, and the like.

The apparatus 100 includes a display unit 103. The display unit 103 includes a function of outputting visually-recognizable information by using, for example, a liquid crystal display (LCD) or a light emitting device (LED). The display unit 103 may further include a function of outputting sound by using, for example, a speaker.

The apparatus 100 includes an operation unit 104. The operation unit 104 receives various types of inputs from a user and sends input information to the control unit 101. The operation unit 104 includes various types of buttons, a touch panel, and the like.

The apparatus 100 includes a communication unit 105. The communication unit 105 controls an antenna 106 to conduct a wireless local area network (LAN) communication complied with the Institute of Electrical and Electronics Engineers (IEEE) 802.11 standard.

The apparatus 100 includes the antenna 106 for conducting the wireless LAN communication.

The foregoing describes the hardware configuration of the communication apparatus and the external apparatus.

FIG. 1 is a mere example and is not intended to limit inclusion of other hardware according to the apparatus. For example, the apparatus 100 may include an image capturing unit configured to capture an image of an object to obtain image data, a Global Positioning System (GPS) unit, and the like. Further, the communication apparatus may use a communication method other than the wireless LAN communication, such as Bluetooth (registered trademark), a public network or the like. Alternatively, the communication apparatus may be configured to include both a wireless communication unit and a wired communication unit.

Further, the control unit of the communication apparatus is not required to be a single piece of hardware. For example, a plurality of pieces of hardware may share a process, so that the pieces of hardware collectively function as a single unit. Alternatively, a single piece of hardware may function as a plurality of units.

<Software Configuration of Communication Apparatus>

Figure 2:
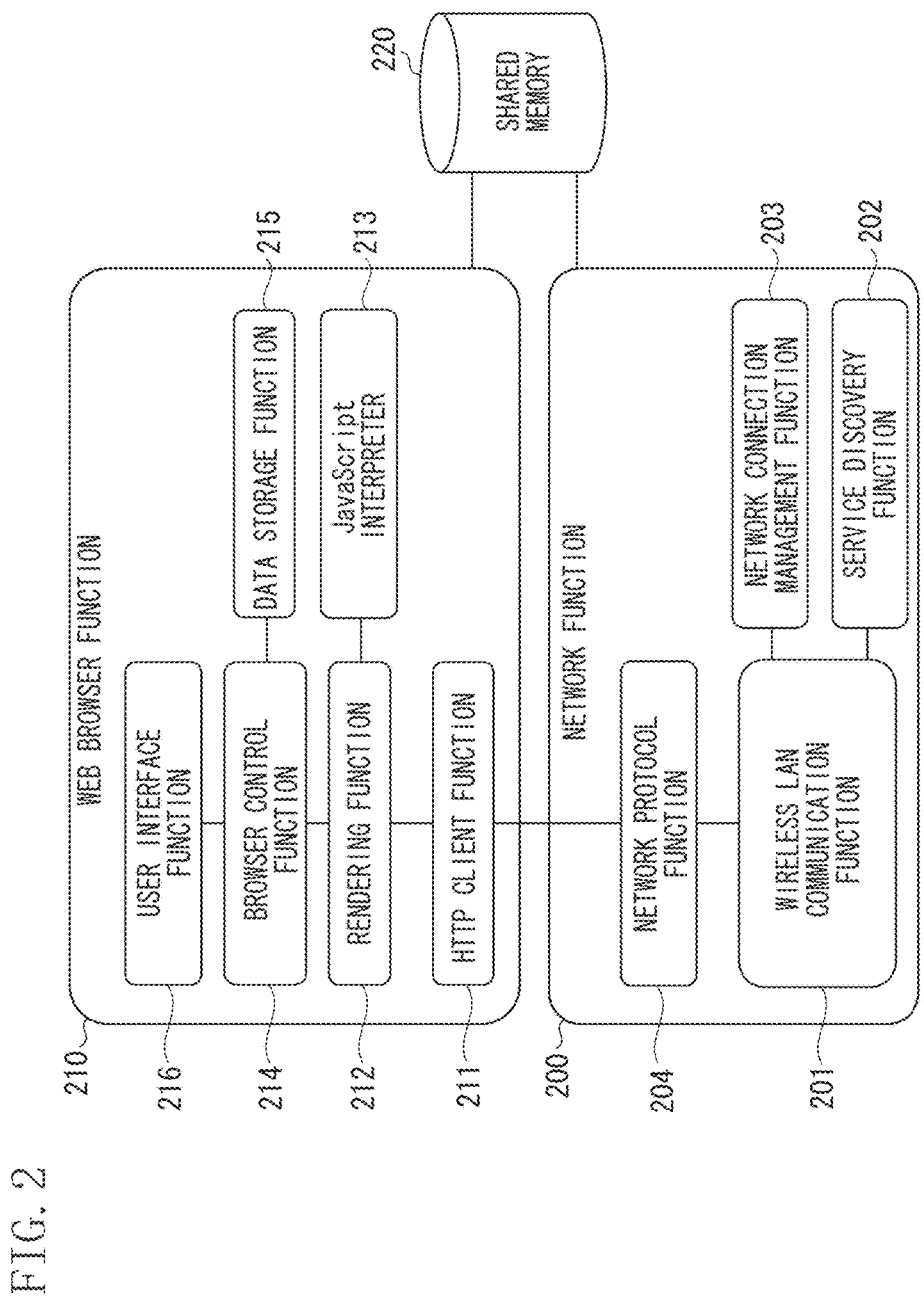
FIG. 2 is a diagram illustrating a software configuration of the communication apparatus.

The following describes a configuration of software to be executed by the control unit 101 of the communication apparatus according to the first exemplary embodiment, with reference to FIG. 2. While software is sometimes described as though it is a component that executes a process in the following description to simplify the description, it is apparent that the control unit or the like that reads the software is the actual component that realizes the process by controlling each component of the communication apparatus.

As illustrated in FIG. 2, the software of the communication apparatus is roughly classified into a network function 200, a web browser function 210, and a shared memory 220 shared by the network function 200 and the web browser function 210. The network function 200 includes a wireless LAN communication function 201, a service discovery function 202, a network connection management function 203, and a network protocol function 204. The web browser function 210 includes an HTTP client function 211, a rendering function 212, a JavaScript (registered trademark) interpreter 213, a browser control function 214, a data storage function 215, and a user interface function 216. The following describes each of the functions.

The wireless LAN communication function 201 is a wireless LAN packet sending/receiving unit configured to send and receive any packet including a communication protocol of an upper layer.

The service discovery function 202 provides a service discovery function. The apparatuses according to the exemplary embodiment support a communication using Wi-Fi Direct. In service discovery, the service discovery function 202 sends and receives a probe frame and an action frame defined by IEEE 802.11 and detects service information provided by an external apparatus. Specifically, the service discovery function 202 (search unit) performs broadcast transmission of a probe request to search for a service and receives a probe response from an external apparatus to detect a service available for use. Then, the service discovery function 202 sends a service discovery query, which is an action frame, and receives a service discovery response from the external apparatus to obtain detailed information about the service. The service discovery response includes information about the service and wireless network information about the external apparatus. According to the exemplary embodiment, a probe frame and an action frame are used in a series of service discoveries. Thus, the series of service discoveries can be performed even when the communication apparatus and an external apparatus do not belong to the same wireless network. The series of service discoveries can also be performed when the communication apparatus and an external apparatus belong to the same wireless network.

The following describes a service. A service refers to a function provided by an external apparatus. Examples of a service according to the exemplary embodiment include a file transfer service, a display service, a web service, and the like. The file transfer service is a service provided mainly by an external apparatus that includes a storage medium, and sending and receiving of files between the communication apparatus and the external apparatus is performed by use of the HTTP protocol. The display service is a service provided mainly by an external apparatus that includes a display unit, and an image sent from an apparatus using the service is displayed on the display unit in real time. The web service is a service provided by an external apparatus that includes a web server, and various types of functions provided by the external apparatus are used on a web browser. The services provided by the web server include, for example, an image browser service, a remote capture service, a print service, and the like. The image browser service is a service provided mainly by a web server apparatus that includes a storage medium storing image data, and a web page in which image data is embedded using Hypertext Markup Language (HTML) becomes available to the public so that an image can be browsed on the web browser. The remote capture service is a service provided by a web server apparatus that includes a camera function, and an operation screen for controlling various types of camera functions, such as image capturing, zooming, and focusing, is provided on a web page, so that remote image capturing is enabled on the web browser. The print service is a service provided by a web server apparatus that includes a print function, and an operation screen for various types of print settings is provided on a web page, so that a print operation is enabled on the web browser. According to the exemplary embodiment, the web server and the web service do not always require the Internet. For example, even in a case where a communication is performed between a communication apparatus and a camera via an intranet, the communication apparatus can control the camera function by using the web browser in such a manner that the camera activates the web server function and provides the web service. In this case, the camera may include a built-in access point (AP) function to configure the intranet.

The service discovery function 202 generates a detected service management table based on information obtained by the service discovery process and stores the detected service management table in the shared memory 220. FIG. 3A is a diagram illustrating an example of the detected service management table. FIG. 3A illustrates an example of the state in which the print service and the remote capture service are detected. Web service information 301 includes a title and a URL. A web browser can use the web service by sending an HTTP request to the URL. Information 302 is for connecting (belonging) to a wireless network through which the web service specified by the web service information 301 is provided. The information 302 includes a media access control (MAC) address, a service set identifier (SSID), and an encryption key.

The service discovery function 202 periodically performs the service discovery process. In a case where a new web service is detected, the service discovery function 202 performs a process to add the detected web service to the detected service management table. Further, in a case where a web service registered in the detected service management table is no longer detected, the service discovery function 202 performs a process to delete the information about the web service from the detected service management table.

The network connection management function 203 stores, in the shared memory 220, information about a connection status of a wireless network. FIG. 4 is a diagram illustrating an example of connection status information. FIG. 4 illustrates an example where a connection is established with a wireless network of which SSID is AP_X. The network connection management function 203 updates the connection status information at a timing of when a connection to or disconnection from a wireless network occurs.

The network connection management function 203 manages the number of simultaneous connections. For example, in a case where the communication apparatus can be connected to a wireless channel in each of the 2.4 GHz band and the 5 GHz band, the maximum number of simultaneous connections is two. In a case where a connection to a new wireless network is requested when the number of simultaneous connections has already reached the maximum number of simultaneous connections, the network connection management function 203 sends an error response to the web browser function 210. Alternatively, the communication apparatus may be disconnected from a currently connected wireless network, and then the communication apparatus may be connected to a new wireless network.

The network protocol function 204 performs protocol processing complied with the Transmission Control Protocol (TCP)/Internet Protocol (IP), such as TCP, User Datagram Protocol (UDP), IP, and Dynamic Host Configuration Protocol (DHCP).

The HTTP client function 211 is a client function complied with the HTTP standard. The HTTP client function 211 generates an HTTP request based on a request from the rendering function 212 and sends a send request to the network function 200. Further, the HTTP client function 211 performs processing to analyze a HTTP response received from the network function 200 and notify the rendering function 212 of the analysis result.

The rendering function 212 is a function to control display processing on a web browser screen. The rendering function 212 has a function to analyze an HTML and Cascading Style Sheets (CSS) and displays, on the web browser screen, an analysis result of a response received from the HTTP client function 211. Further, the rendering function 212 performs display processing on the web browser screen or controls communication processing with the web server via the HTTP client function 211, according to an execution result of the JavaScript (registered trademark) interpreter 213 and a response result to a user operation via the user interface function 216.

The JavaScript (registered trademark) interpreter 213 performs processing to obtain, from the rendering function 212, JavaScript (registered trademark) included in the HTTP response and to return a script execution result to the rendering function 212.

The browser control function 214 controls actions between the user interface function 216 and the rendering function 212. Further, the browser control function 214 controls the data storage function 215.

The data storage function 215 stores, in the storage unit 102, various types of data to be used in the web browser, such as cookies, application caches, a bookmark management table, and the like.

The user interface function 216 receives various types of user inputs and notifies the browser control function 214 of the user inputs. The user interface function 216 receives various types of inputs via, for example, an operation to a function of the web browser, such as an address bar or a bookmark, and an operation on a displayed web page screen.

The following describes the bookmark management table according to the exemplary embodiment. The bookmark management table is a table that manages information for access to a web service in such a manner that the information is associated with wireless network information. The bookmark management table is stored in the data storage function 215.

FIG. 5A is a diagram illustrating an example of the bookmark management table of a state where the communication apparatus has not performed wireless LAN communication. Web service information 501 includes either of the name of a website on the Internet or a title that is the name of a web service, and a URL for access to the web service. This is to realize a similar function to a bookmark function that exists as a common function of a web browser. The bookmark management table according to the exemplary embodiment further includes wireless network information 502. The wireless network information 502 includes information about the MAC address, an SSID, and an encryption key of a connected apparatus. In FIG. 5A, "Weather," "News," and "Dictionary," which are examples of websites on the Internet, are registered. The "Weather" is a website that provides weather forecasts. The "News" is a website that provides news information. The Dictionary" is a website that provides a dictionary function. Before wireless LAN communication is performed, the wireless network information is empty.

Next, FIG. 5B is a diagram illustrating an example of the bookmark management table of a case where the communication apparatus starts wireless LAN communication to connect to the Weather site. Wireless network information about an access point for the wireless LAN connection to connect to the Weather site is added. In a case where the communication apparatus in the state illustrated in FIG. 5B stops the web browser function and the wireless LAN communication is ended, the bookmark management table is updated to the state illustrated in FIG. 5A.

FIG. 5C is a diagram illustrating an example of the bookmark management table in a case where a web service provided by an external apparatus is detected by the service discovery function 202. The bookmark management table according to the exemplary embodiment can comprehensively manage not only a URL of website and also web services provided by an external apparatus at the periphery. FIG. 5C illustrates the bookmark management table in which the contents of the detected service management table illustrated in FIG. 3A are integrated. IDs 4 and 5 each corresponds to an integrated content of the detected service management table. In a case where the web services of the IDs 4 and 5 are no longer detected in the state illustrated in FIG. 5C, the bookmark management table is updated to the state illustrated in FIG. 5B. The foregoing describes the software configuration of the communication apparatus.

<Software Configuration of External Apparatus>

The configuration of software to be executed by the control unit 101 of the external apparatus according to the present exemplary embodiment will be described below with reference to FIG. 6.

Figure 6:
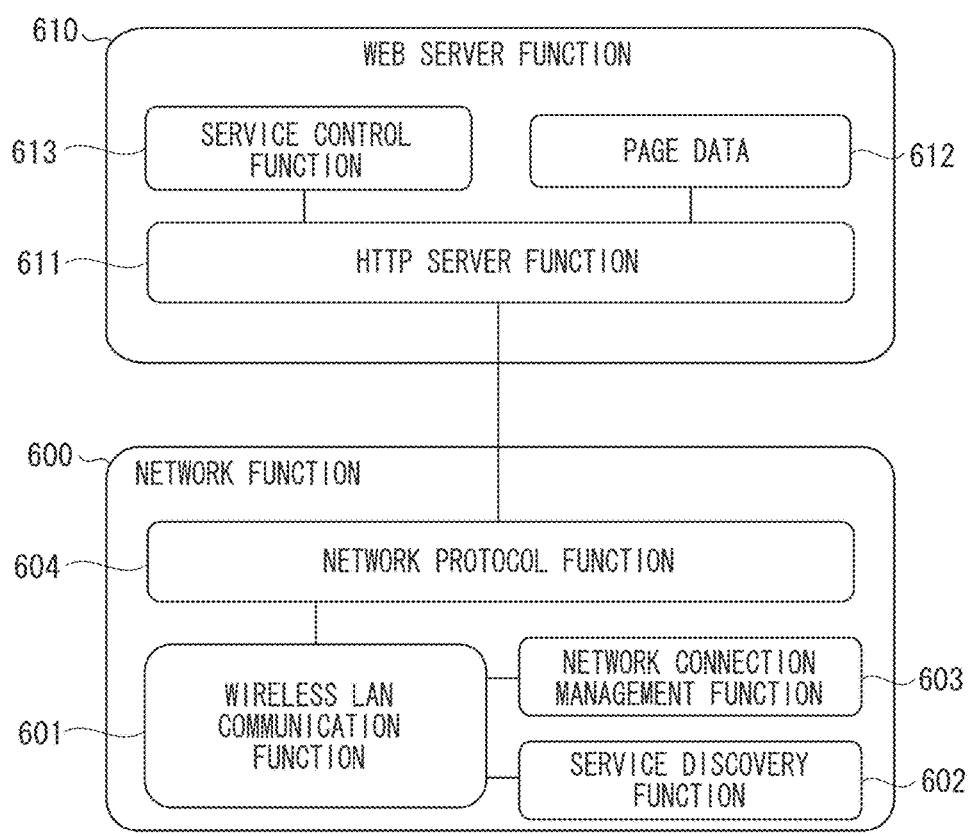
FIG. 6 is a diagram illustrating a software configuration of the external apparatus.

As illustrated in FIG. 6, the software of the external apparatus includes a network function 600 and a web server function 610. The network function 600 includes a wireless LAN communication function 601, a service discovery function 602, a network connection management function 603, and a network protocol function 604. The web server function 610 includes an HTTP server function 611, page data 612, and a service control function 613. The following describes each of the functions.

The wireless LAN communication function 601 is a wireless LAN packet sending/receiving unit configured to send and receive any packet including a communication protocol of an upper layer.

The service discovery function 602 is a unique service discovery function of Wi-Fi Direct, and probe and action frames defined by IEEE 802.11 are sent and received, so that service information provided by an external apparatus becomes available to the public. Specifically, in a case where an external apparatus receives a broadcast probe request and the external apparatus can provide a service specified by the probe request, the external apparatus sends a probe response. Then, upon reception of a service discovery query, which is an action frame, the external apparatus sends a service discovery response including detailed information about the service.

The network connection management function 603 performs processing to belong to a wireless network and processing to disconnect from the wireless network.

The network protocol function 604 performs protocol processing complied with TCP/IP, such as TCP, UDP, IP, and DHCP.

The HTTP server function 611 is a server function complied with the HTTP standard. The HTTP server function 611 analyzes the HTTP request received from the network function 600 and then either obtains the page data 612 or requests the service control function 613 to provide contents of the request, depending on the analysis result. After acquiring the page data 612 or a response from the service control function 613, the HTTP server function 611 performs processing to generate an HTTP response and send the HTTP response to the network function 600.

The page data 612 is data for configuring a web page, such as HTML data, CSS data, JavaScript (registered trademark) data, image data, and the like.

The service control function 613 is a function to execute various types of services, such as a print service, a remote camera service, and the like. A requested process is executed in response to various types of processing requests sent from the web browser using the HTTP protocol, and an execution result is sent as a HTTP response to the web browser. The foregoing describes the software configuration of the external apparatus.

<Network Configuration>

The configuration of a network system according to the exemplary embodiment will be described below with reference to FIG. 7.

A mobile terminal 701 including a web browser is an example of the communication apparatus illustrated in FIG. 2. Examples of a mobile terminal include a mobile phone, such as a smartphone, a tablet terminal, a personal computer, and the like.

A printer 702, a camera 703, and a video camera 704 each provide a web service. Each of the printer 702, the camera 703, and the video camera 704 is an example of the external apparatus illustrated in FIG. 6.

An AP 705 is an access point of the wireless LAN.

A website 706 is a website that exists on the Internet network and is connected to the mobile terminal 701 via the AP 705.

Figure 7:
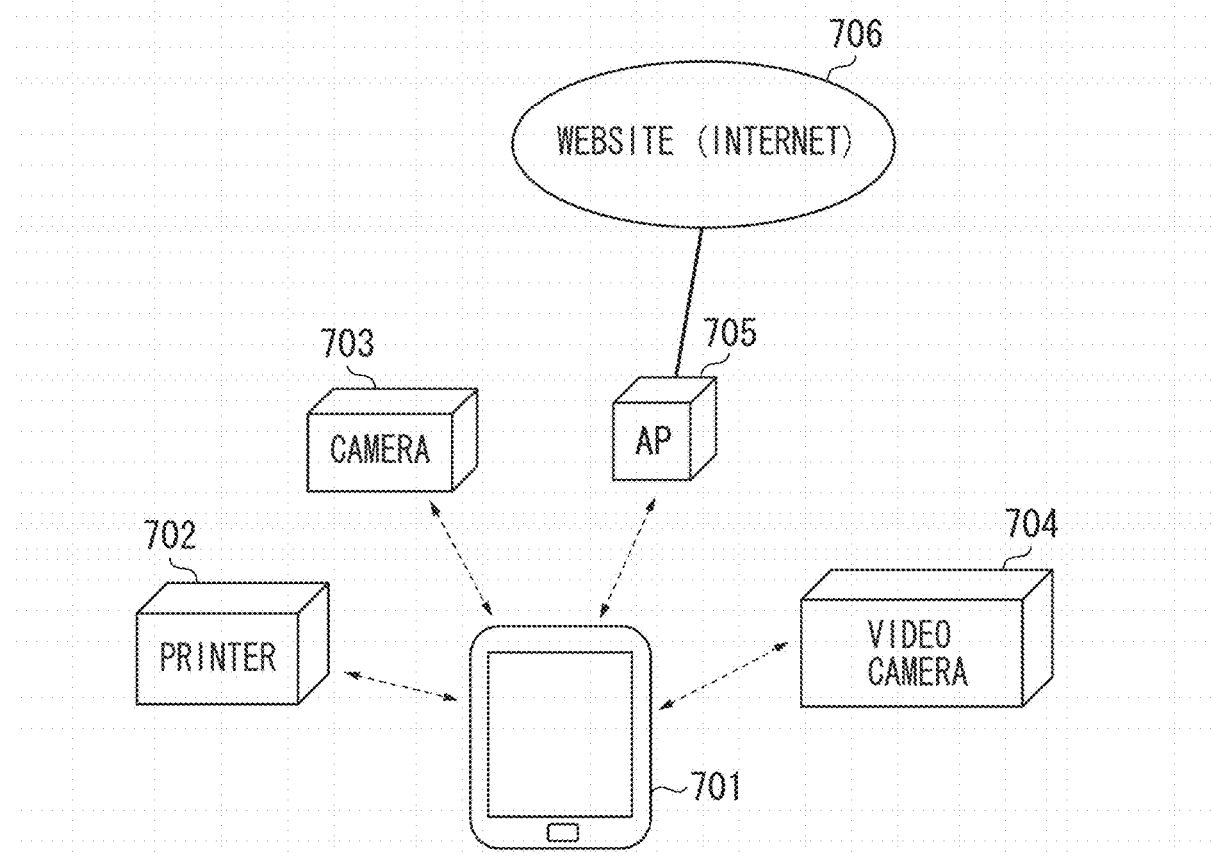
FIG. 7 is a diagram illustrating a configuration of a network system.

As indicated by the dotted lines illustrated in FIG. 7, the mobile terminal 701 can establish a connection to the printer 702, the camera 703, and the video camera 704 via a peer-to-peer wireless network by Wi-Fi Direct. Further, the mobile terminal 701 can establish an infrastructure connection to the AP 705 as a wireless LAN station.

<Web Service Detection Process>

A process of detecting a web service by the communication apparatus according to the exemplary embodiment will be described below with reference to FIG. 8. Specifically, a process in which a web service provided by the video camera 704 is detected by the mobile terminal 701 and the detected web service is displayed on the web browser screen in the network system configuration described above will be described.

Figure 9A:
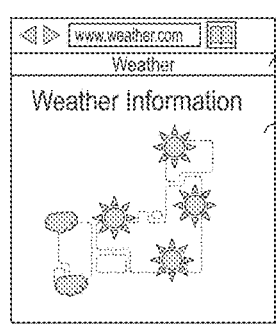
FIGS. 9A, 9B, 9C, 9D, 9E, 9F, and 9G are diagrams each illustrating an example of a web browser screen of the communication apparatus.

First, in an initial state, the mobile terminal 701 has established wireless network communication with the AP 705 and currently uses the website via the AP 705. Specifically, the mobile terminal 701 displays the web page of the Weather site. An example of the displayed screen of the mobile terminal 701 in this state is illustrated in FIG. 9A. A tab 901 is for displaying a name of a service and indicates the Weather site. A web page screen 902 is a web page screen provided by the Weather site.

Further, in the initial state, the mobile terminal 701 has already detected the web service provided by the printer 702 and the web service provided by the camera 703. The detected service management table and the bookmark management table in the initial state are illustrated in FIGS. 3A and 5C, respectively.

Further, in the initial state, all of the software functions of the mobile terminal 701 and the video camera 704 are available for use.

Further, in the initial state, the service discovery function 602 of the video camera 704 is valid and ready to respond to a probe request and a service discovery query.

Figure 8:
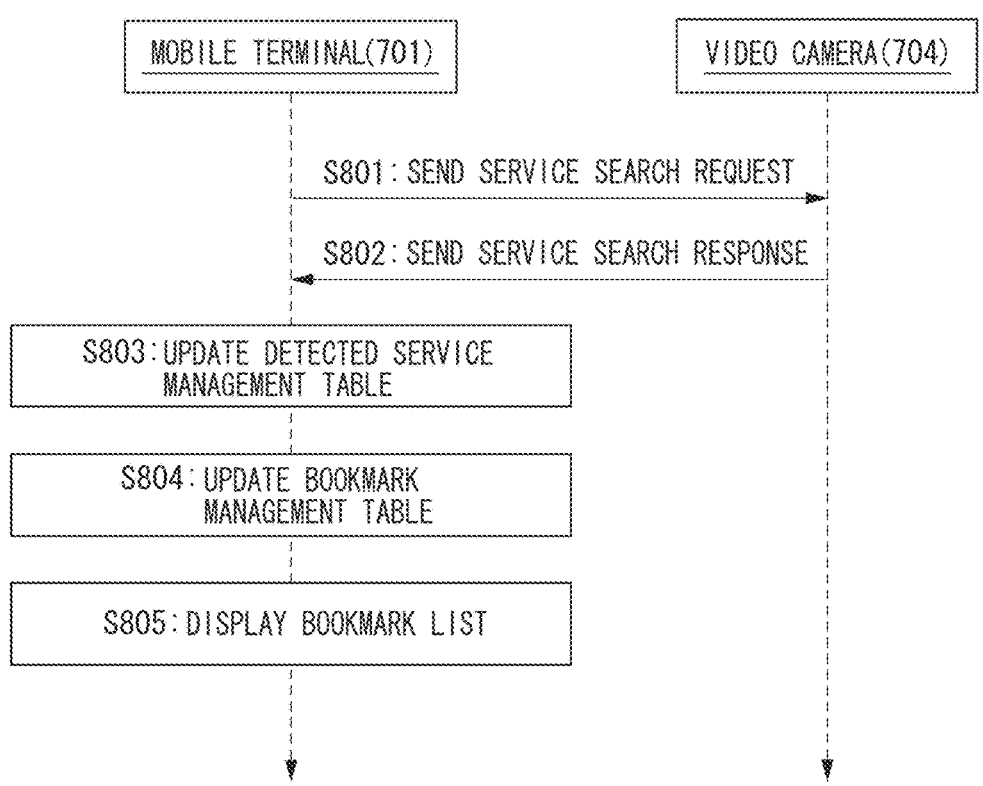
FIG. 8 is a diagram illustrating a web service detection process of the communication apparatus.

The following describes each step illustrated in FIG. 8.

In step S801, the service discovery function 202 of the mobile terminal 701 sends a service search request. The service search request is broadcast and received by the video camera 704. Step S801 is automatically performed periodically while the web browser function 210 is activated.

In step S802, the service discovery function 602 of the video camera 704 responds to the service search request and sends a service search response including information about the web service provided by the video camera 704 and information for wireless network connection with the video camera 704. The service search response is received by the mobile terminal 701. The service search response is an example of external apparatus information.

In step S803, the service discovery function 202 of the mobile terminal 701 updates the detected service management table on the shared memory 220 based on the service search response. Specifically, the information about the web service provided by the video camera 704 is added. FIG. 3B illustrates an example of the detected service management table updated in step S803. In FIG. 3B, an ID 3 indicating the web service ("Image Browser") provided by the video camera 704 is added.

In step S804, the browser control function 214 of the mobile terminal 701 updates the bookmark management table based on the updated detected service management table. FIG. 5D is a diagram illustrating an example of the bookmark management table updated in step S804. In FIG. 5D, an ID 6 indicating the web service provided by the video camera 704 is added.

In step S805, the rendering function 212 of the mobile terminal 701 displays a bookmark list on the web browser screen when the bookmark management table is updated.

Figure 9B:
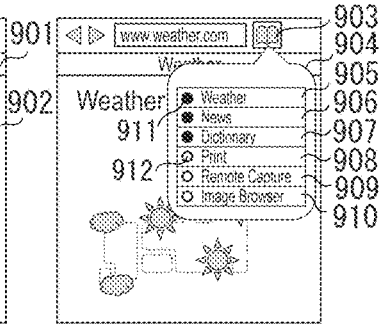

An example of the web browser screen displayed in step S805 is illustrated in FIG. 9B. A bookmark button 903 and a bookmark list screen 904 are displayed. In this example, the bookmark list screen 904 is automatically displayed when the bookmark management table is updated. Alternatively, the bookmark button 903 may automatically only be highlighted when the bookmark management table is updated, and the bookmark list screen 904 may be displayed only at the press of the bookmark button 903.

Titles 905 to 910 of websites/web services correspond to the IDs 1 to 6 illustrated in FIG. 5D. The Image Browser service 910 may be highlighted to indicate that it is a newly detected service. Further, the Weather site 905 may be displayed differently by, for example, highlighting the Weather site 905, so that the user can recognize that the mobile terminal 701 is currently connected to the web service.

Circles 911 and 912 indicate the connection statuses of the mobile terminal 701 to the wireless networks where the web services are provided. A black circle indicates that the connection is established (the mobile terminal 701 is currently connected to the AP 705), and a white circle indicates that the connection is disconnected. The displays of the circles 911 and 912 are controlled based on the connection status information described above with reference to FIG. 4. It is also possible to display, in a distinguishable manner, a service provided by the external apparatus that is discovered in the service discovery and a website of which URL is registered in advance as a bookmark. The foregoing describes the web service detection process.

According to the present exemplary embodiment, the service detection process described in steps S801 and S802 utilizes a method in which the mobile terminal 701 issues a search request to inquire, the method is not limited to the one described above. For example, the video camera 704 may periodically broadcast a beacon including web service information and wireless network information, and the mobile terminal 701 may be configured to receive the beacon.

<Web Service Connecting Process>

A connecting process of the communication apparatus for a web service according to the exemplary embodiment will be described below with reference to FIG. 10. Specifically, the following describes a process up to the start of the use of a specified web service by the mobile terminal 701, which is an example of the communication apparatus according to the exemplary embodiment, in the network system configuration described above.

The flow chart illustrated in FIG. 10 is started when, for example, the user operates a bookmark to request connection to a designated web service (e.g., "Image Browser" illustrated in FIG. 9B).

In step S1001, the control unit 101 determines whether the communication apparatus is currently connected to a wireless network associated with the designated web service. Specifically, the control unit 101 obtains wireless network information corresponding to the web service by referring to the bookmark management table illustrated in FIG. 5 and determines whether the communication apparatus is connected to the corresponding wireless network by referring to the connection status information illustrated in FIG. 4. As a result of the determination, in a case where the control unit 101 determines that the communication apparatus is not connected to the corresponding wireless network (NO in step S1001), the processing proceeds to step S1002. On the other hand, in a case where the control unit 101 determines that the communication apparatus is connected to the corresponding wireless network (YES in step S1001), the processing proceeds to step S1005.

In step S1002, the control unit 101 determines whether it is possible to connect to a new wireless network. Specifically, the control unit 101 determines whether the number of simultaneous connections has already reached the maximum number of simultaneous connections that is managed by the network connection management function 203. As a result of the determination, in a case where the control unit 101 determines that it is not possible to connect to a new wireless network because the number of simultaneous connections has already reached the maximum number of simultaneous connections (NO in step S1002), the processing proceeds to step S1003. On the other hand, in a case where the control unit 101 determines that it is possible to connect to a new wireless network because the number of simultaneous connections has not reached the maximum number of simultaneous connections (YES in step S1002), the processing proceeds to step S1004.

In step S1003, the control unit 101 disconnects the communication apparatus from the connected wireless network. For example, in a case where the maximum number of simultaneous connections is one, the control unit 101 performs processing to disconnect the communication apparatus from the currently-connected wireless network. In a case where the maximum number of simultaneous connections is two or more, the control unit 101 selects one of the currently-connected wireless networks as a target wireless network from which the communication apparatus is to be disconnected. As to criteria for the selection of the target wireless network from which the communication apparatus is to be disconnected, for example, a wireless network with the oldest connection start time may be selected automatically, or the user may select a wireless network. Further, when the process of disconnecting the communication apparatus from the wireless network is to be executed, a warning indicating that the wireless LAN communication will be stopped may be provided to the user. Further, an inquiry about whether the user agrees to disconnect the communication apparatus from the wireless network may be issued to the user.

In step S1004, the control unit 101 performs a process for connecting the communication apparatus (causing the communication apparatus to belong) to the wireless network by Wi-Fi Direct. After the process for connecting to the wireless network, a process of setting an IP address based on the Dynamic Host Configuration Protocol (DHCP) is also performed. In a case where the communication apparatus to be connected includes an access point function, it is also possible to connect the communication apparatus as a station to the wireless network using the infrastructure mode of the wireless LAN instead of Wi-Fi Direct.

In step S1005, the control unit 101 issues an HTTP request to the URL corresponding to the web service. The control unit 101 obtains the URL corresponding to the web service by referring to the bookmark management table illustrated in FIG. 5.

Figure 9C:
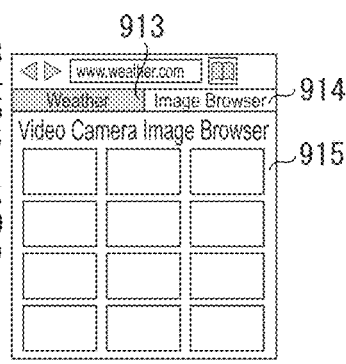

In step S1006, the control unit 101 receives an HTTP response and displays a web service screen on the web browser screen based on the contents of the HTTP response. FIG. 9C illustrates an example of the web browser screen displayed in step S1006 in a case where the Image Browser service 910 is selected by a user operation on the screen illustrated in FIG. 9B. A tab 913 is a tab for the Weather site, and a tab 914 is a tab for the Image Browser service, which is newly created in step S1006. A web page screen 915 is a web page screen of the Image Browser service acquired from the video camera 704. When the Image Browser service 910 on the screen illustrated in FIG. 9B is selected by a user operation, the web browser sends an HTTP request to the URL "http://videocamera/browse/". Upon receiving the HTTP request, the web server of the video camera 704 sends, to the web browser, HTML data as an HTTP response in which thumbnail images of image data stored in the video camera 704 are embedded with an <img> tag. The HTML obtained from the HTTP response is analyzed to display the screen 915. FIG. 9C is a diagram illustrating the case where the new tab is created at the time of displaying the web page screen of the Image Browser service, any other forms of display may also be used. For example, the web page of the Weather site may be switched to the web page of the Image Browser service without creating a new tab. Further, a new window may be additionally generated instead of a new tab. The foregoing describes the process up to the point at which the mobile terminal 701 is connected to the web service.

In a case where the communication apparatus is disconnected from the wireless network in step S1003, the display of the disconnected web page screen may be continued as off-line display in order that the user is not conscious of the connection status of the wireless network. In this way, when the user performs an operation (that involves HTTP request processing) again on the web page displayed off-line, the flow chart illustrated in FIG. 10 is started again to perform the wireless network connecting process.

Further, in step S1003, a request for holding a session status, such as HTTP cookies, may be issued to the web server to be disconnected, immediately before the disconnection from the wireless network. In this way, when the user re-connects to the disconnected web service, the user can restart using the web service with the session status of the time of disconnection from the wireless network.

According to the present exemplary embodiment, the name of the detected service is displayed on the web browser, the name of a device may be displayed by including the device name in the web service information. Alternatively, other identification information from which the user can identify a detected device may be displayed. The service search response is an example of external apparatus information. Specifically, only a part of the information may be detected, and the communication apparatus having detected the part of the information may make an inquiry to the external apparatus about further detailed information. Accordingly, the web browser is displayed by the control unit 101. Also, the control unit 101 receives the designation of the identification information. Furthermore, the control unit 101 establishes communication with the external apparatus corresponding to the designated identification information. Thus, the control unit 101 functions as a display control means, a reception means, and a communication control means.

The following describes a process of detecting a web service by a communication apparatus according to a second exemplary embodiment, with reference to the drawings.

Since the present exemplary embodiment has many similarities to the foregoing exemplary embodiment, description of the similar points is omitted, and unique points of the present exemplary embodiment will mainly be described below. The same applies to each of the exemplary embodiments described below.

<Web Service Detection Process>

Figure 11:
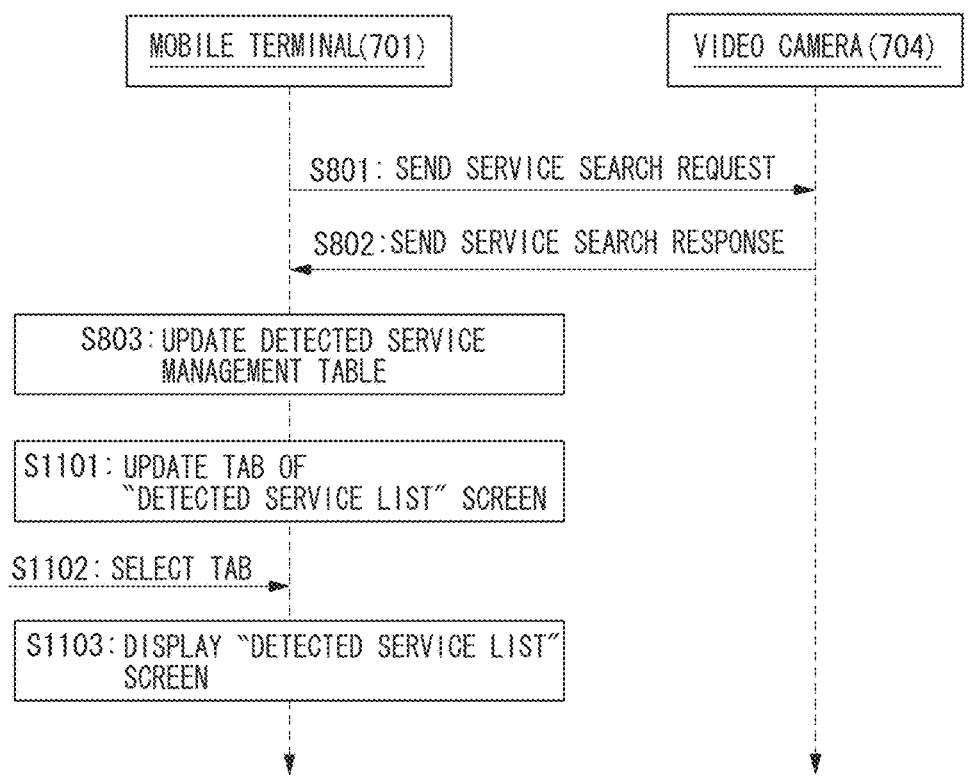
FIG. 11 is a diagram illustrating a web service detection process of the communication apparatus.

The following describes the process of detecting a web service by the communication apparatus according to the second exemplary embodiment, with reference to FIG. 11. Only different points from the process sequence described above in the first exemplary embodiment with reference to FIG. 8 will be described below.

In step S1101, the rendering function 212 of the mobile terminal 701 updates a tab of a "detected service list" screen when the detected service management table is detected.

The "detected service list" screen is a dedicated page for displaying a list of detected web service. The update of a tab includes not only the update of an existing tab but also generation of a new tab and deletion of a tab. For example, a new tab may be generated in a case where a new detected service management table is generated, and the tab may be deleted in a case where all pieces of information on the web service is deleted from the detected service management table. Further, the updated tab may be highlighted so that the user can recognize the updated tab with ease.

Figure 9D:
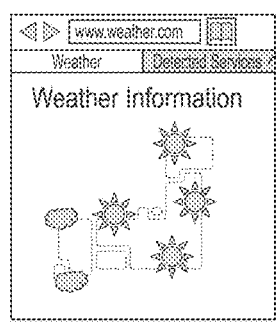

FIG. 9D is a diagram illustrating an example of the web browser screen displayed in this state. A tab 916 is a tab of the created "detected service list" screen. In a case where the detected service management table is updated when the tab of the "detected service list" screen is already generated, no new tab of the "detected service list" screen is generated.

In step S1102, the user interface function 216 of the mobile terminal 701 receives a "detected service list" screen display request issued by a user operation. Specifically, the tab displayed in step S1101 is selected.

Figure 9E:
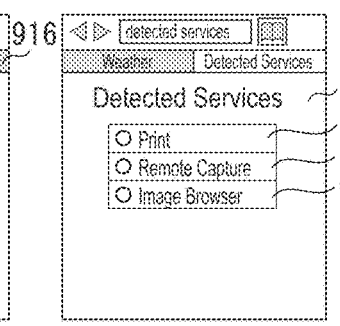

In step S1103, the rendering function 212 of the mobile terminal 701 displays the "detected service list" screen based on the contents of the detected service management table illustrated in FIG. 3B. FIG. 9E is a diagram illustrating an example of the web browser screen displayed in this state. A screen 917 is a "detected service list" screen. Titles 918 to 920 of web services are listed, and each of the titles 918 to 920 is a link to the URL of the web service. In a case where an operation for connecting to any of the links is received, the web service connecting process described above with reference to FIG. 10 is performed. The foregoing describes the web service detection process.

According to the present exemplary embodiment, the "detected service list" screen is displayed when the user operation is performed. However, this is not a limiting case. The "detected service list" screen may be displayed when the detected service management table is updated.

<Web Service Detection Process>

Figure 12:
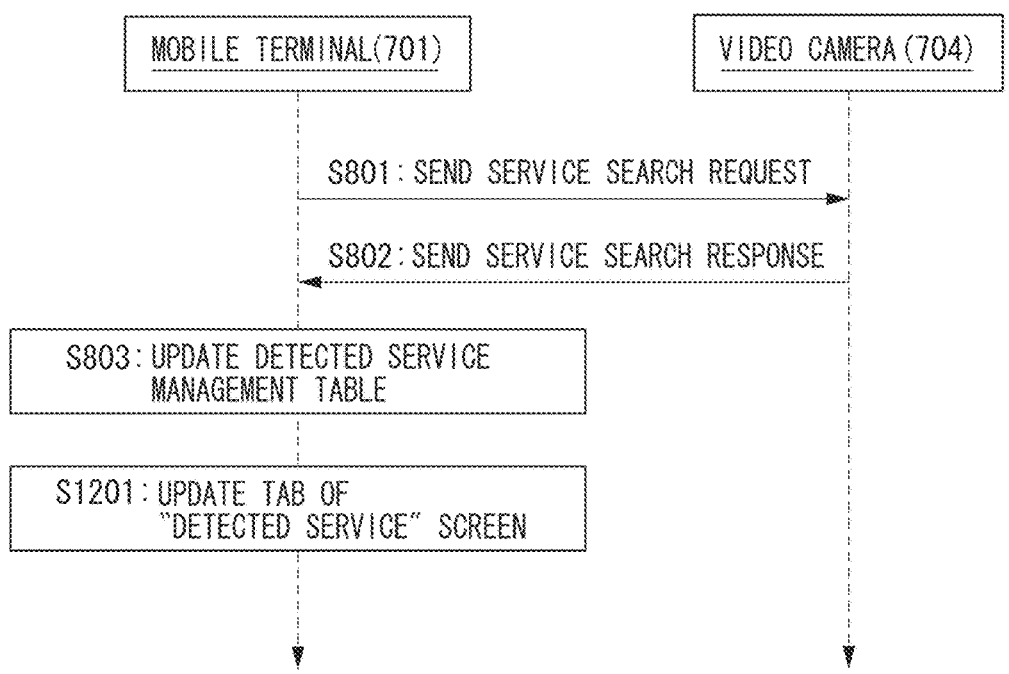
FIG. 12 is a diagram illustrating a web service detection process of the communication apparatus.

A process of detecting a web service by a communication apparatus according to a third exemplary embodiment will be described below with reference to FIG. 12.

In step S1201, the rendering function 212 of the mobile terminal 701 generates or deletes a tab of a "detected service" screen when the detected service management table is updated.

The "detected service" screen is a page of a detected web service and is generated for each web service.

For example, in a case where information about a new web service is added to the detected service management table, a tab of a corresponding "detected service" screen is generated. The created tab may be highlighted so that the user can recognize the tab with ease. On the other hand, in a case where a web service is deleted from the detected service management table, the tab of the corresponding "detected service" screen is deleted.

Figure 9F:
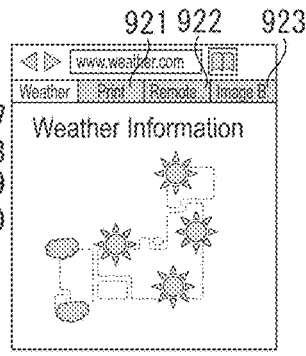

FIG. 9F is a diagram illustrating an example of the web browser screen displayed in this state. Tabs 921 to 923 are tabs of "detected service" screens that are respectively generated for the web services. In a case where any of the tabs is selected by the user and a "detected service" screen display request is received, the web service connecting process described above with reference to FIG. 10 is performed. The foregoing describes the web service detection process.

<Web Service Detection Process>

Figure 13:
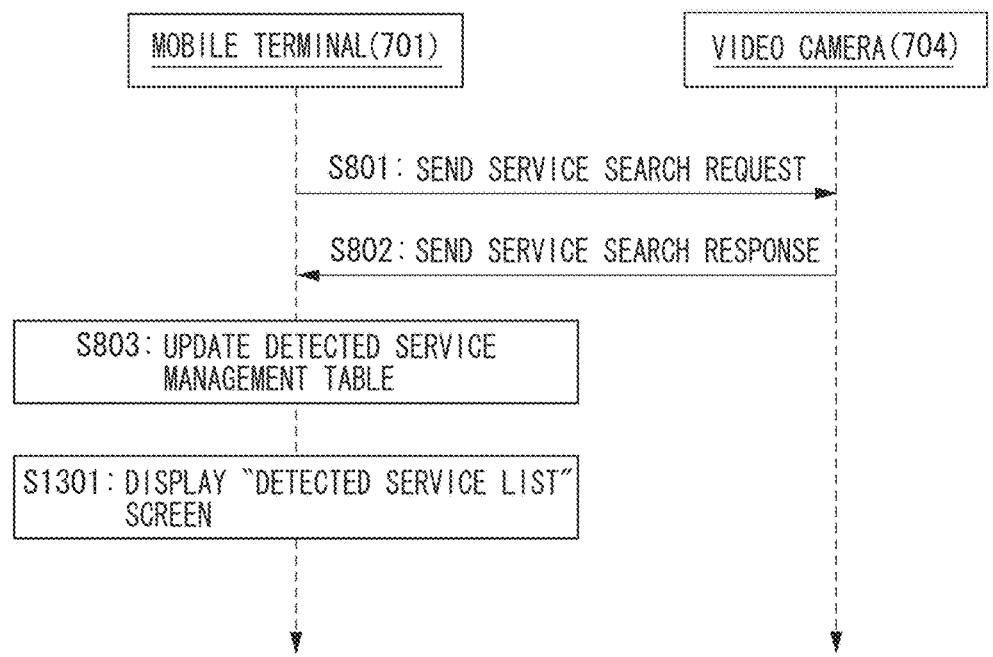
FIG. 13 is a diagram illustrating a web service detection process of the communication apparatus.

A process of detecting a web service by a communication apparatus according to a fourth exemplary embodiment will be described below with reference to FIG. 13.

In step S1301, the rendering function 212 of the mobile terminal 701 automatically executes a detected service display button to display a detected service list when the detected service management table is updated.

The detected service button is a dedicated button located on the web browser screen. The detected web service list is displayed at the press of the detected service button by the user or at the automatic execution of the detected service button by the web browser.

Figure 9G:
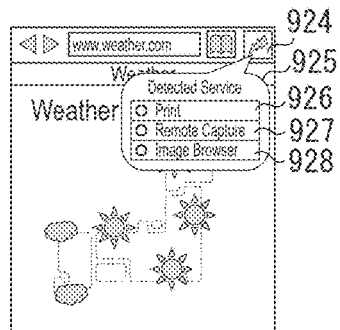

FIG. 9G is a diagram illustrating an example of the web browser screen displayed in this state. A button 924 is a detected service display button. A screen 925 is a web service list screen displayed at the execution of the detected service display button. Titles 926 to 928 of the web services are listed. In a case where a request for connection to any of the web services that is issued by a user operation is received, the web service connecting process described above with reference to FIG. 10 is performed.

The foregoing describes the web service detection process.

According to the present exemplary embodiment, the detected service display button is automatically executed when the detected service management table is updated. However, this is not a limiting case. When the detected service management table is updated, for example, the detected service display button may be highlighted to notify the user of the update and prompt the user to perform an operation to execute the detected service display button.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-113128, filed May 30, 2014, which is hereby incorporated by reference herein in its entirety.

What is claimed is:

1. A communication apparatus capable of communicating with another apparatus via a network, the communication apparatus comprising:

at least one processor; and
a predetermined communication interface,
wherein the at least one processor is configured to function as following units:
a receiving unit configured to receive at least one piece of external apparatus information sent from at least one external apparatus via the predetermined communication interface, the received at least one piece of external apparatus information including service identification information that identifies at least one service able to be provided by the at least one external apparatus;
a display control unit configured to perform control so as to display, using a web browser, at least one piece of the service identification information from the received at least one piece of external apparatus information that identifies the at least one service provided by the at least one external apparatus;
a control unit configured to, out of the at least one piece of service identification information displayed by using the web browser, receive a selection of any piece of the displayed at least one piece of the service identification information to designate the any piece of the displayed at least one piece of the service information as selected identification information; and
a communication control unit configured to establish communication, via the predetermined communication interface, with an external apparatus corresponding to the selected identification information;
wherein the receiving unit is capable of receiving the at least one piece of external apparatus information sent from the at least one external apparatus even if the at least one external apparatus does not belong to a same network as the communication apparatus, and
wherein in a case where the selected identification information indicates that the external apparatus corresponding to the selected identification information does not belong to the same network as the communication apparatus, the communication control unit performs control to cause the communication apparatus to belong to the same network as the external apparatus corresponding to the selected identification information and establish a communication with the external apparatus corresponding to the selected identification information.

2. The communication apparatus according to claim 1, wherein after the communication control unit establishes the communication with the external apparatus corresponding to the selected identification information, the communication apparatus uses the service provided by the external apparatus corresponding to the selected identification information.

3. The communication apparatus according to claim 1, wherein the service identification information included in the at least one piece of external apparatus information includes a uniform resource locator (URL) for using the service.

4. The communication apparatus according to claim 1, wherein in a case where a plurality of pieces of external apparatus information is received by the receiving unit, the display control unit performs control so as to collectively display, in a bookmark list of the web browser, identification information based on the plurality of pieces of received external apparatus information.

5. The communication apparatus according to claim 1, wherein in a case where a plurality of pieces of external apparatus information is received by the receiving unit, the display control unit generates, on the web browser, a different tab or window for each of the plurality of pieces of external apparatus information.

6. The communication apparatus according to claim 1, wherein in a case where a plurality of pieces of external apparatus information is received by the receiving unit, the display control unit generates a tab or a window on the web browser.

7. The communication apparatus according to claim 1, wherein the display control unit performs control to display, on the web browser, a button for displaying a list of identification information based on the at least one piece of external apparatus information received by the receiving unit.

8. The communication apparatus according to claim 1, wherein the display control unit performs control so as to display the identification information in such a manner that whether the external apparatus corresponding to the at least one piece of external apparatus information and the communication apparatus participate in the same network is determinable.

9. The communication apparatus according to claim 1, further comprising a management unit configured to, after the communication control unit establishes the communication with the external apparatus corresponding to the selected identification information, manage the external apparatus information about the external apparatus corresponding to the selected identification information and information about the network in which the communication apparatus participated when the communication is established in association with each other.

10. The communication apparatus according to claim 1, wherein the at least one piece of external apparatus information is information about a service provided by the at least one external apparatus.

11. The communication apparatus according to claim 10, wherein the information about the service includes a printing service.

12. The communication apparatus according to claim 10, wherein the information about the service includes a remote capturing service.

13. The communication apparatus according to claim 10, wherein the information about the service includes an image browsing service.

14. The communication apparatus according to claim 1, wherein the display control unit performs control so as to display at least one piece of identification information for identifying the external apparatus information on a bookmark list of the web browser.

15. The communication apparatus according to claim 1, wherein a bookmark list of the web browser includes the at least one piece of identification information for identifying the external apparatus information and identification information for identifying a web site.

16. A method of controlling a communication apparatus having a predetermined communication interface and being capable of communicating with an external apparatus via a network, the method comprising:
receiving at least one piece of external apparatus information sent from at least one external apparatus via the predetermined communication interface, the received at least one piece of external apparatus information including service identification information that identifies at least one service able to be provided by the at least one external apparatus;
displaying, using a web browser, at least one piece of the service identification information from the received at least one piece of external apparatus information that identifies the at least one service provided by the at least one external apparatus information;
receiving a selection of any piece of identification information out of the at least one piece of service identification information displayed by using the web browser to designate the any piece of the displayed at least one piece of service information as selected identification information; and
establishing communication, via the predetermined communication interface, with an external apparatus corresponding the selected identification information,
wherein the communication apparatus is capable of receiving the at least one piece of external apparatus information from at least one external apparatus even if the at least one external apparatus does not belong to a same network as the communication apparatus, and
wherein in a case where selected identification information indicates that the external apparatus corresponding to the selected identification information does not belong to the same network as the communication apparatus, causing the communication apparatus to belong to the same network as the external apparatus corresponding to the selected identification information and establishes a communication with the external apparatus corresponding to the selected identification information.

17. A non-transitory computer-readable recording medium storing executable instructions that, when executed, controls a communication apparatus to execute a control method, the control method comprising:
receiving at least one piece of external apparatus information sent from at least one external apparatus via a predetermined communication interface, the received at least one piece of external apparatus information including service identification information that identifies at least one service able to be provided by the at least one external apparatus;
displaying, using a web browser, at least one piece of the service identification information from the received at least one piece of external apparatus information that identifies the at least one service provided by the at least one external apparatus information;
receiving a selection of any piece of identification information out of the at least one piece of service identification information displayed by using the web browser to designate the any piece of the displayed at least one piece of service information as selected identification information; and
establishing communication, via the predetermined communication interface, with an external apparatus corresponding the selected identification information,
wherein the communication apparatus is capable of receiving the at least one piece of external apparatus information from at least one external apparatus even if the at least one external apparatus does not belong to a same network as the communication apparatus, and
wherein in a case where selected identification information indicates that the external apparatus corresponding to the selected identification information does not belong to the same network as the communication apparatus, causing the communication apparatus to belong to the same network as the external apparatus corresponding to the selected identification information and establishes a communication with the external apparatus corresponding to the selected identification information.

* * * * *